United States Patent
Cheatham, III et al.

(10) Patent No.: US 9,618,618 B2
(45) Date of Patent: Apr. 11, 2017

(54) SYSTEMS AND METHODS FOR ULTRASONIC POSITION AND MOTION DETECTION

(71) Applicant: Elwha LLC, Bellevue, WA (US)

(72) Inventors: Jesse R. Cheatham, III, Seattle, WA (US); Roderick A. Hyde, Redmond, WA (US); Muriel Y. Ishikawa, Livermore, CA (US); Jordin T. Kare, Seattle, WA (US); Craig J. Mundie, Seattle, WA (US); Nathan P. Myhrvold, Bellevue, WA (US); Robert C. Petroski, Seattle, WA (US); Eric D. Rudder, Mercer Island, WA (US); Desney S. Tan, Kirkland, WA (US); Clarence T. Tegreene, Mercer Island, WA (US); Charles Whitmer, North Bend, WA (US); Andrew Wilson, Seattle, WA (US); Jeannette M. Wing, Bellevue, WA (US); Lowell L. Wood, Jr., Bellevue, WA (US); Victoria Y. H. Wood, Livermore, CA (US)

(73) Assignee: ELWHA LLC, Bellevue, WA (US)

( * ) Notice: Subject to any disclaimer, the term of this patent is extended or adjusted under 35 U.S.C. 154(b) by 402 days.

(21) Appl. No.: 14/203,401

(22) Filed: Mar. 10, 2014

(65) Prior Publication Data

US 2015/0253424 A1    Sep. 10, 2015

(51) Int. Cl.
*G01S 15/89*    (2006.01)
*G01S 5/18*    (2006.01)
(Continued)

(52) U.S. Cl.
CPC .......... *G01S 15/89* (2013.01); *G01S 7/52003* (2013.01); *G01S 15/08* (2013.01); *G01S 15/46* (2013.01);
(Continued)

(58) Field of Classification Search
CPC .......... G01S 5/18; G01S 3/808; G01S 3/8083; G01S 5/22; G01S 15/04
(Continued)

(56) References Cited

U.S. PATENT DOCUMENTS 4,114,146 A * 9/1978 Inoue ................ G08B 13/1627
    342/28
5,686,942 A    11/1997 Ball
(Continued)

OTHER PUBLICATIONS

Dijk et al, "Estimation #D Device Position by ANalyzing Ultrasonic Reflection Signals", Workshop PRORISC 2003, Veldhoven, NL, Book of Abstract, Nov. 26, 2003, pp. 88-94.*
(Continued)

*Primary Examiner* — Ian J Lobo

(57) ABSTRACT

The present disclosure provides systems and methods associated with determining position and/or movement information using ultrasound. A system may include one or more ultrasonic transmitters and/or receivers. An ultrasonic transmitter may be configured to transmit ultrasound into a region bounded by one or more surfaces. The ultrasonic receiver may receive direct ultrasonic reflections and/or rebounded ultrasonic reflections from one or more objects within the region. A mapping or positioning system may generate positional data associated with one or more of the object(s) based on the direct ultrasonic reflection(s) and/or the rebounded ultrasonic reflection(s). The mapping or positioning system may generate enhanced positional data by combining the direct positional data and the rebounded positional data.

28 Claims, 10 Drawing Sheets

(51) Int. Cl.
  *G01S 7/52* (2006.01)
  *G01S 15/08* (2006.01)
  *G01S 15/46* (2006.01)
  *G01S 15/74* (2006.01)
  *G01S 15/87* (2006.01)

(52) U.S. Cl.
  CPC ............ *G01S 15/74* (2013.01); *G01S 15/876* (2013.01); *G01S 5/18* (2013.01)

(58) Field of Classification Search
  USPC .................................................. 367/124, 93
  See application file for complete search history.

(56) References Cited

U.S. PATENT DOCUMENTS

| | | | |
|---|---|---|---|
| 5,702,323 A | 12/1997 | Poulton | |
| 6,066,075 A | 5/2000 | Poulton | |
| 6,243,322 B1 * | 6/2001 | Zakarauskas | G01S 11/14 367/124 |
| 6,690,618 B2 * | 2/2004 | Tomasi | G01S 5/18 367/124 |
| 6,857,746 B2 | 2/2005 | Dyner | |
| 7,317,819 B2 | 1/2008 | Janes | |
| 7,952,962 B2 | 5/2011 | Walley et al. | |
| 8,243,141 B2 | 8/2012 | Greenberger et al. | |
| 2004/0001182 A1 | 1/2004 | Dyner | |
| 2004/0013292 A1 | 1/2004 | Raunig | |
| 2005/0020902 A1 | 1/2005 | Janes | |
| 2005/0288588 A1 | 12/2005 | Weber et al. | |
| 2007/0085828 A1 | 4/2007 | Schroeder et al. | |
| 2008/0039199 A1 | 2/2008 | Baer et al. | |
| 2008/0311990 A1 | 12/2008 | Chiu et al. | |
| 2008/0316863 A1 | 12/2008 | Walley et al. | |
| 2009/0017910 A1 | 1/2009 | Rofougaran et al. | |
| 2009/0052859 A1 | 2/2009 | Greenberger et al. | |
| 2009/0054147 A1 | 2/2009 | Chiu et al. | |
| 2009/0170601 A1 | 7/2009 | Chiu et al. | |
| 2009/0251996 A1 * | 10/2009 | Dijk | G01S 5/22 367/127 |
| 2009/0258706 A1 | 10/2009 | Rofougaran et al. | |
| 2010/0002550 A1 | 1/2010 | Oumi et al. | |
| 2010/0278008 A1 | 11/2010 | Ammar | |
| 2011/0141013 A1 | 6/2011 | Matthews | |
| 2011/0269517 A1 | 11/2011 | Englert et al. | |
| 2012/0055250 A1 | 3/2012 | Hashimoto et al. | |
| 2012/0062729 A1 | 3/2012 | Hart et al. | |
| 2012/0147705 A1 * | 6/2012 | Hick | G01S 15/04 367/93 |
| 2012/0224456 A1 | 9/2012 | Visser et al. | |
| 2012/0308140 A1 | 12/2012 | Ambrus et al. | |
| 2012/0309532 A1 | 12/2012 | Ambrus et al. | |
| 2013/0002550 A1 | 1/2013 | Zalewski | |
| 2013/0154930 A1 | 6/2013 | Xiang et al. | |
| 2013/0249937 A1 | 9/2013 | Amacker et al. | |
| 2013/0254066 A1 | 9/2013 | Amacker et al. | |
| 2013/0254646 A1 | 9/2013 | Amacker et al. | |
| 2013/0254647 A1 | 9/2013 | Amacker et al. | |
| 2013/0254648 A1 | 9/2013 | Amacker et al. | |

OTHER PUBLICATIONS

PCT International Search Report; International App. No. PCT/US2015/019614; May 19, 2015; pp. 1-3.

* cited by examiner

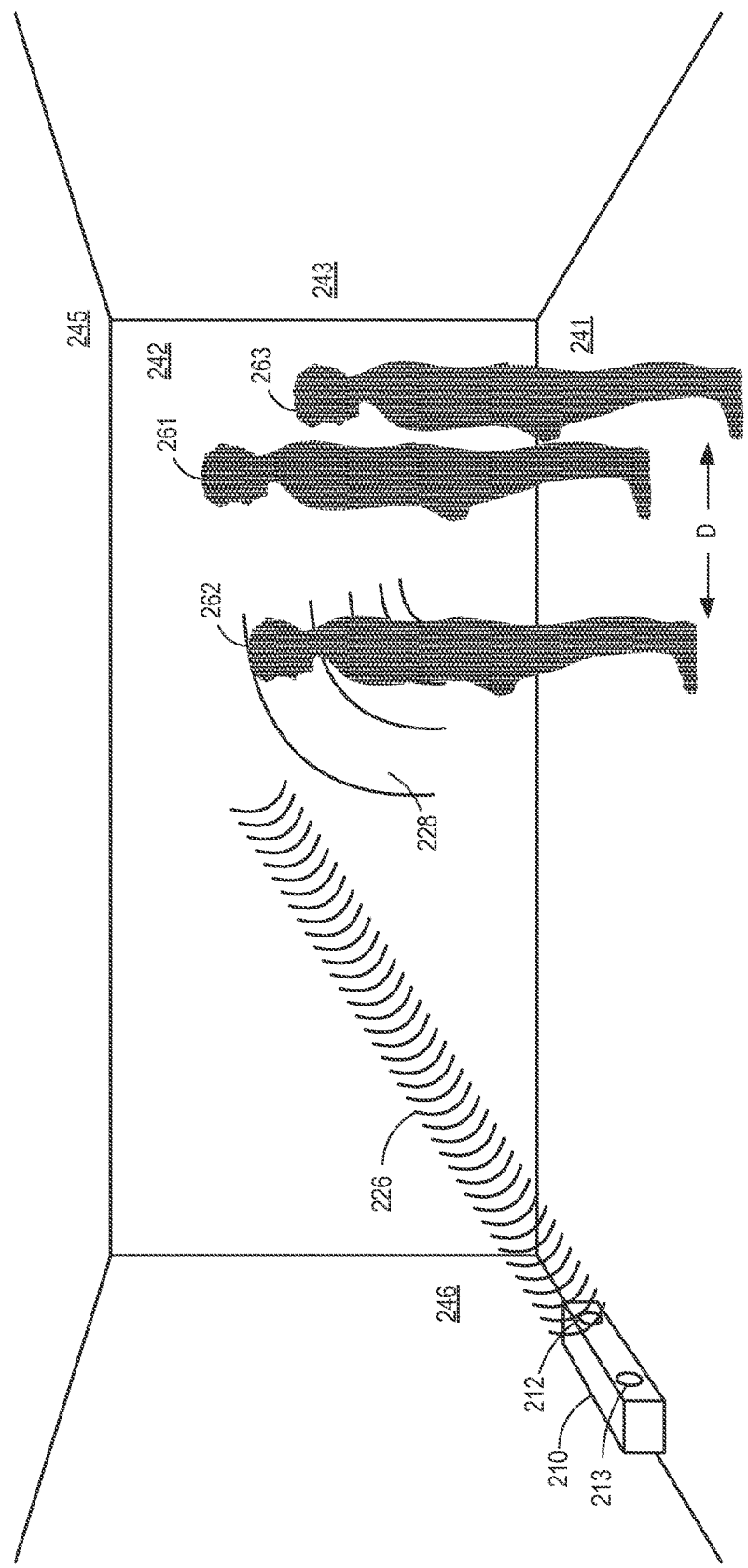

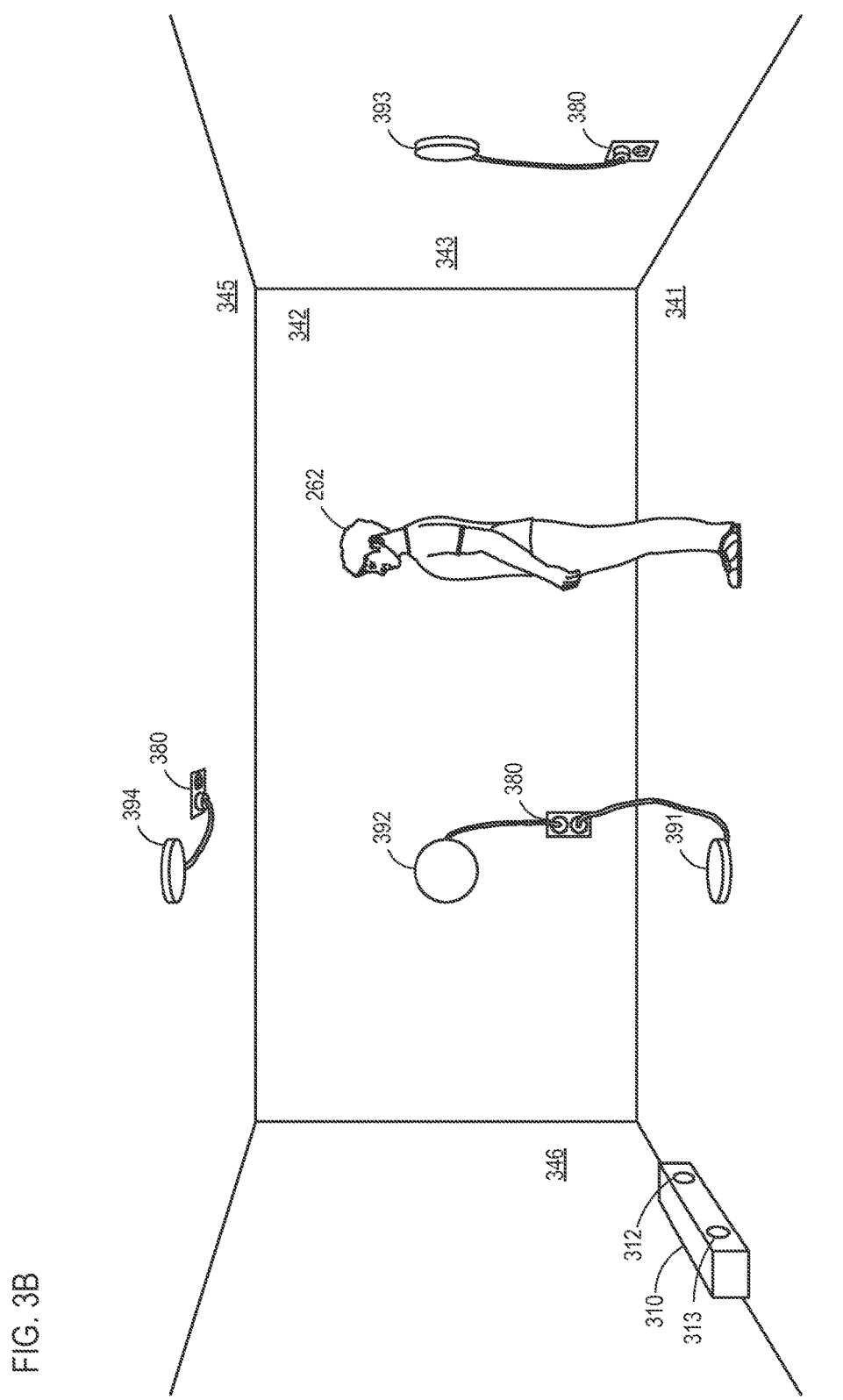

SYSTEMS AND METHODS FOR ULTRASONIC POSITION AND MOTION DETECTION

If an Application Data Sheet ("ADS") has been filed on the filing date of this application, it is incorporated by reference herein. Any applications claimed on the ADS for priority under 35 U.S.C. §§119, 120, 121, or 365(c), and any and all parent, grandparent, great-grandparent, etc., applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 U.S.C. §119(e) for provisional patent applications, for any and all parent, grandparent, great-grandparent, etc., applications of the Priority Application(s)).

PRIORITY APPLICATIONS

NONE

RELATED APPLICATIONS

If the listings of applications provided herein are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc., applications of the Priority Applications and the Related Applications, including any priority claims, is incorporated herein by reference to the extent such subject matter is not inconsistent herewith.

TECHNICAL FIELD

This disclosure relates to systems and methods for determining relative positional and/or motion data of objects. Specifically, the disclosure provides systems and methods for using reflected ultrasound to determine positional and/or motion data.

SUMMARY

A system may include one or more ultrasonic transmitters and/or receivers. In some embodiments the transmitter(s) and/or receiver(s) may be embodied as one or more transceivers. An ultrasonic transmitter may be configured to transmit ultrasound into a region bounded by one or more surfaces. The ultrasonic receiver may receive direct ultrasonic reflections from one or more objects within the region. That is, the ultrasound may travel directly from the transmitter to the object, and then return from the object to the receiver.

Additionally, the ultrasonic receiver may receive rebounded ultrasonic reflections from one or more objects within the region. For instance, the receiver may receive ultrasound that reflects off one or more of the surfaces and then off one or more objects prior to being received by the ultrasonic receiver. Similarly, the receiver may receive ultrasound that reflects off one or more objects and then off one or more of the surfaces prior to being received by the ultrasonic receiver.

A mapping or positioning system may generate positional data associated with one or more of the object(s) based on the direct ultrasonic reflection. The mapping or positioning system may also generate positional data using the rebounded ultrasonic reflection of the object(s) from the one or more surfaces. It will be appreciated that a rebounded ultrasonic reflection from a surface may be rebounded off the surface first and then the object, or off the object first and then the surface.

It will also be appreciated that more complex rebound situations may exist, e.g., a rebounded ultrasonic reflection may be rebounded off a first surface, then an object, and then again rebounded from the first surface and/or from any number of additional surface any number of times before being received by the positioning system.

The mapping or positioning system may then generate enhanced positional data by combining the direct positional data and the rebounded positional data. The enhanced positional data may be a concatenation of the direct and rebounded positional data or a simple or complex function of the direct and rebounded positional data. The enhanced positional data may be further enhanced or augmented using additional positional data obtained via direct or rebounded ultrasonic reflections and/or other positional data, such as positional data obtained via other means (e.g., laser detection, cameras, etc.).

In various embodiments, one or more local, remote, or distributed systems and/or system components may transmit ultrasound via an ultrasonic transmitter into a region. The received ultrasound may include both direct reflections and rebounded reflections. Positional data from both the direct reflections and the rebounded reflections may be used to obtain positional data that more accurately and/or more quickly describes the relative positional data of one or more objects within the region.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 2B illustrates a side view of the positioning system rebounding the ultrasound off the wall and then toward the three persons.

FIG. 3B illustrates a plurality of active ultrasonic reflectors configured to facilitate the transmission, reflection, and/or reception of rebounded ultrasound by the positioning system.

DETAILED DESCRIPTION

Figure 1A:
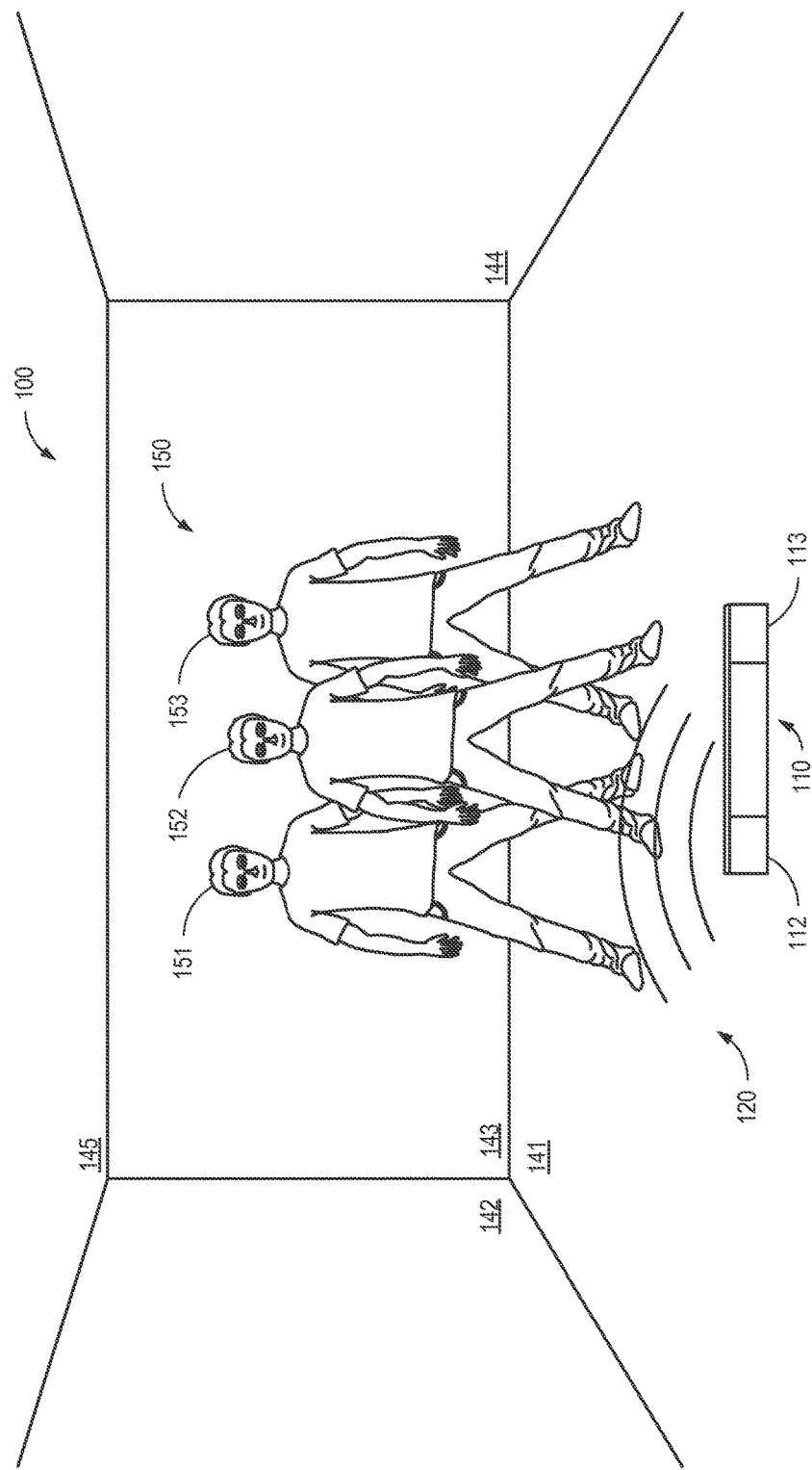
FIG. 1A illustrates a positioning system transmitting ultrasound toward three persons within a bounded region.

A system may include one or more ultrasonic transmitters and/or receivers. In some embodiments the transmitter(s) and/or receiver(s) may be embodied as one or more transceivers. An ultrasonic transmitter may be configured to transmit ultrasound into a region bounded by one or more surfaces. The ultrasound may be between 20 kHz and 250 kHz. In one embodiment, the ultrasound is specifically between 35 kHz and 45 kHz.

One or more of the ultrasonic transmitters, receivers, and/or transceivers may comprise a piezoelectric transducer that may be part of a single transducer system or an array of transducers. The ultrasonic receiver may comprise a first ultrasonic transducer configured to receive direct ultrasonic reflections and a second ultrasonic transducer to receive rebounded ultrasonic reflections. One or more transducers may be configured to transmit and/or receive directional ultrasound, focused ultrasound, or ultrasound from a phased array of transducers.

In some embodiments, the transducers may comprise or be made from metamaterials. A flat sub-wavelength array of ultrasonic transducers may be used in conjunction with the embodiments described herein, such as those utilizing arrays of metamaterials In some embodiments, the direct ultrasound may be reflected from a first portion of an object and the rebounded ultrasound may be reflected from a second, different portion of the object. Similarly, the direct positional data may correspond to a first directional component of the position of the object and the rebounded positional data may correspond to a second directional component of the position of the object.

Any number of direct and/or rebounded ultrasonic reflections may be obtained from one or more objects within a region to obtain positional data over a period of time and/or to obtain more accurate positional data with multiple data points. The transmitted ultrasound may be transmitted as directional or nondirectional ultrasonic pulses, continuously, in a modulated (frequency, amplitude, phase, etc.) fashion, and/or other format. The ultrasonic transmissions may be spaced at regular intervals, on demand, and/or based on the reception of a previously transmitted ultrasonic transmission. Direct and rebounded ultrasound pulses may be transmitted at the same time, or either one can be transmitted before the other.

Rebounded ultrasonic reflections may be defined as ultrasonic reflections that, in any order, reflect off at least one surface in addition to the object. For example, the rebounded ultrasonic reflections may be reflected off any number of surfaces and/or objects (in any order) prior to being received by the ultrasonic receiver.

A mapping or positioning system may generate positional data associated with one or more of the object(s) based on the direct ultrasonic reflection(s) and/or the rebounded ultrasonic reflection(s). The positional data may comprise a centroid of the objects, a two-dimensional mapping of the object, an image of the object, a false-color representation of the object, an information representation (blocks, squares, shadows, etc.) of the object, a three-dimensional mapping of the object, one or more features of the object, and/or other information.

The positional data may be defined with respect to one or more surfaces of the region, the positioning system, a receiver of the positioning system, and/or a transmitter of the positioning system. The one or more objects within the region may comprise machinery, robots, furniture, household property, people in general, gamers, human controllers of electronic devices, electronic devices, fixtures, and/or other human or non-human objects.

The object may comprise a specific portion of a person, such as a hand, figurer, arm, leg, foot, toe, torso, neck, head, mouth, lip, or eye. In some embodiments, rebounded ultrasonic transmissions may be reflected off an ultrasonic reflector disposed within the room. In some embodiments, the ultrasonic reflectors may be mounted and/or otherwise positioned within the region. In other embodiments, the ultrasonic reflectors may be held, worn, and/or otherwise in the position of the user or operator of the ultrasonic positioning system. The ultrasonic reflectors may modify a characteristic of the reflected ultrasound, facilitating the identification of the received rebounded ultrasonic reflections.

Ultrasonic reflectors may comprise passive, active, and/or actively moved/pivoted ultrasonic reflectors for controlling the direction in which ultrasound rebounds and/or otherwise travels within the region. For example, the ultrasonic reflector may be configured to modify one or more of the frequency, phase, and/or amplitude of the rebounded ultrasound. The modified characteristic may facilitate the differentiation of the direct ultrasonic reflections and the rebounded ultrasonic reflections. In some embodiments the direct and rebounded signals can be differentiated using knowledge of the transmission or reception directions of the respective beams. In some embodiments, the direct and rebounded signals can be differentiated using knowledge of the time-of-flight of the respective beams. In some embodiments, the direction of a reflected beam (and hence directional characteristics of its delivered positional information) can be determined by knowledge of the orientation of the reflecting surface and its reflective characteristics. For example, ultrasonic reflection from a surface may be dominated by specular reflection, thereby allowing straightforward determination of the rebound geometry.

The mapping or positioning system may also generate positional data using the rebounded ultrasonic reflection of the object(s) from the one or more surfaces. It will be appreciated that a rebounded ultrasonic reflection from a surface may be rebounded off the surface first and then the object, or off the object first and then the surface.

The mapping or positioning system may then generate enhanced positional data by combining the direct positional data and the rebounded positional data. The enhanced positional data may be a concatenation of the direct and rebounded positional data or a simple or complex function of the direct and rebounded positional data.

For example, in one embodiment, the direct and rebounded positional data may comprise only time-of-flight information, which based upon air sound-speed can be converted to transit distance information for each beam. In such embodiments, the direct positional data provides a range from the transceiver to the object, i.e., leaving the position undefined along a two-dimensional spherical surface. Each potential object position along this spherical surface leads, e.g., assuming specular reflections, to a distinct time-of-flight for the rebounded beam from one surface (wall, ceiling, floor); this restricts the locus of possible object positions to a one-dimensional arc along the spherical surface, thereby improving the positional estimate.

The mapping or positional system can further refine the positional data by analyzing rebound data from a second surface. In the current example, each potential object position along the spherical surface (obtained by the time-of-flight of the direct beam) defines a first time-of-flight for ultrasound rebounded from the first surface and a second time-of-flight for ultrasound rebounded from the second surface; knowledge of both times-of-flight determines the object's position. It is clear that time-of-flight data from other surfaces can, by "over defining" the problem can improve the positional estimate, e.g., by reducing sensitivity to measurement errors, to the effects of diffuse reflections, etc. In other embodiments, the direct and rebounded positional data may comprise directional information.

For example, directional information for direct ultrasound can identify that the object (or a specified portion of it) lies along a known ray, thereby providing two components of its position. Information from rebounded ultrasound can then provide additional positional data sufficient to identify the third component of the object's position, i.e., its location along the ray. The rebounded ultrasound may provide time-of-flight information; each object location along the ray corresponds to a different time-of-flight for rebounded ultrasound from a surface, so the measured time-of-flight identifies the object's location. The rebounded ultrasound may provide directional information (either for transmission or reception); the intersection of this rebound ray with the direct ray serves to identify the object's location.

The enhanced positional data may be further enhanced or augmented using additional positional data obtained via direct or rebounded ultrasonic reflections and/or other positional data, such as positional data obtained via other means (e.g., laser detection, cameras, etc.). The direct and the rebounded positional data may provide positional data for the object at the same or at different times, depending on the time at which they are reflected from the object. The enhanced positional data may be analyzed using a dynamical model, e.g., a Kalman filter, designed to combine positional data corresponding to different times or directional components, using them together with, and to improve, estimates of the object's motion.

In some embodiments, direct ultrasonic reflections may not be used. Rather, a first rebounded ultrasonic reflection and a second rebounded ultrasonic reflection may be used to generate positional data. It is appreciated that any number of direct or rebounded ultrasonic reflections may be used to identify a position and/or movement of an object within a region. In various embodiments, the positional data gathered using ultrasonic reflections may be combined with other positional data, such as infrared, positional data provided by manual input, echo location, sonar techniques, laser, and/or the like.

In various embodiments, one or more local, remote, or distributed systems and/or system components may transmit ultrasound via an ultrasonic transmitter into a region. The received ultrasound may include both direct reflections and rebounded reflections. Positional data from both the direct reflections and the rebounded reflections may be used to obtain positional data that more accurately and/or more quickly describes the relative positional data of one or more objects within the region.

Embodiments may include various steps, which may be embodied in machine-executable instructions to be executed by a computer system. A computer system includes one or more general-purpose or special-purpose computers (or other electronic devices). The computer system may include hardware components that include specific logic for performing the steps or may include a combination of hardware, software, and/or firmware.

Embodiments may also be provided as a computer program product including a computer-readable medium having stored thereon instructions that may be used to program a computer system or other electronic device to perform the processes described herein. The computer-readable medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/computer-readable media suitable for storing electronic instructions.

Computer systems and the computers in a computer system may be connected via a network. Suitable networks for configuration and/or use as described herein include one or more local area networks, wide area networks, metropolitan area networks, and/or "Internet" or IP networks, such as the World Wide Web, a private Internet, a secure Internet, a value-added network, a virtual private network, an extranet, an intranet, or even standalone machines which communicate with other machines by physical transport of media. In particular, a suitable network may be formed from parts or entireties of two or more other networks, including networks using disparate hardware and network communication technologies.

One suitable network includes a server and several clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

The network may include communications or networking software, such as the software available from Novell, Microsoft, Artisoft, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Each computer system includes at least a processor and a memory; computer systems may also include various input devices and/or output devices. The processor may include a general purpose device, such as an Intel®, AMD®, or other "off-the-shelf" microprocessor. The processor may include a special purpose processing device, such as an ASIC, SoC, SiP, FPGA, PAL, PLA, FPLA, PLD, or other customized or programmable device. The memory may include static RAM, dynamic RAM, flash memory, one or more flip-flops, ROM, CD-ROM, disk, tape, magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The computer systems may be capable of using a floppy drive, tape drive, optical drive, magneto-optical drive, or other means to read a storage medium. A suitable storage medium includes a magnetic, optical, or other computer-readable storage device having a specific physical configuration. Suitable storage devices include floppy disks, hard disks, tape, CD-ROMs, DVDs, PROMs, random access memory, flash memory, and other computer system storage devices. The physical configuration represents data and instructions which cause the computer system to operate in a specific and predefined manner as described herein.

Suitable software to assist in implementing the invention is readily provided by those of skill in the pertinent art(s) using the teachings presented here and programming languages and tools, such as Java, Pascal, C++, C, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Several aspects of the embodiments described will be illustrated as software modules or components. As used herein, a software module or component may include any type of computer instruction or computer executable code located within a memory device. A software module may, for instance, include one or more physical or logical blocks of computer instructions, which may be organized as a routine, program, object, component, data structure, etc., that perform one or more tasks or implement particular abstract data types.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Much of the infrastructure that can be used according to the present invention is already available, such as: general purpose computers, computer programming tools and techniques, computer networks and networking technologies, digital storage media, authentication, access control, and other security tools and techniques provided by public keys, encryption, firewalls, and/or other means.

The embodiments of the disclosure are described below with reference to the drawings, wherein like parts are designated by like numerals throughout. The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. In other instances, well-known structures, materials, or operations are not shown or described in detail to avoid obscuring aspects of this disclosure.

Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor do the steps need to be executed only once.

FIG. 1A illustrates a positioning system 110 transmitting ultrasound 120 toward three persons 151, 152, and 153 in a group 150 within a bounded region 100. As illustrated, the bounded region 100 is bounded by a floor 141, a left wall 142, a back wall 143, a right wall 144, and a ceiling 145. A front wall (not shown), may also bound the region 100.

The positioning system 110 may transmit the ultrasound 120 as directional ultrasonic pulses, continuously, in a modulated fashion (frequency, amplitude, phase, etc.), and/or in another format. The ultrasound 120 may be transmitted directly toward the persons 151, 152, and 153. The ultrasound 120 may be transmitted indirectly toward the persons 151, 152, and 153.

In various embodiments, the positioning system 110 may be any shape or size and/or may comprise a plurality of distributed components. The illustrated embodiment is merely an example and is not intended to convey any information regarding shape, size, configuration, or functionality. In various embodiments, the positioning system 110 may include an array of transducers, such as piezoelectric transducers, configured to transmit and/or receive ultrasound. The positioning system 110 may be configured with a first plurality of transducers 112 (or a single transducer) for transmitting ultrasound and a second plurality of transducers 113 (or a single transducer for receiving ultrasound.

Figure 1B:
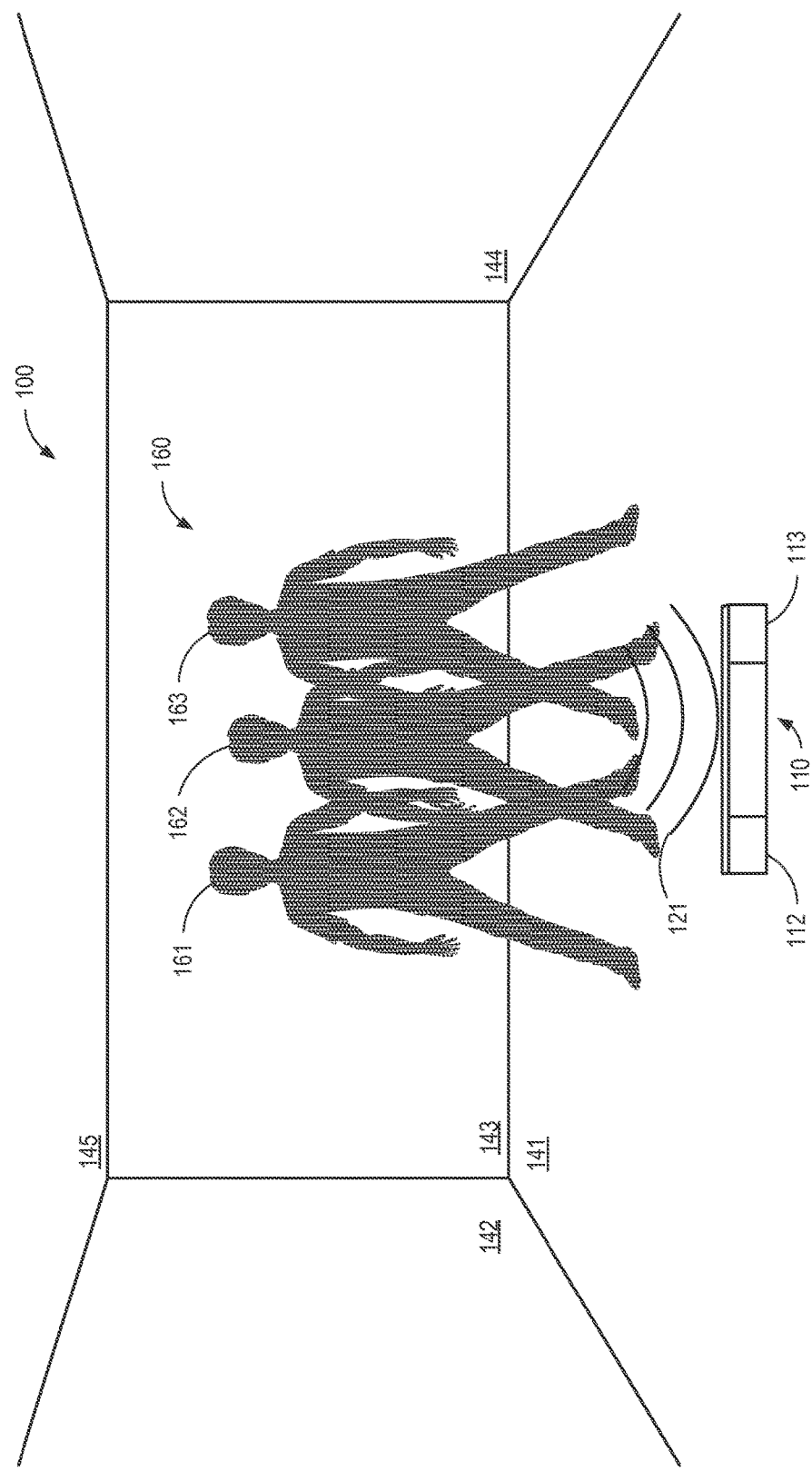
FIG. 1B illustrates a direct ultrasonic reflection received by the positioning system and the resulting "image" generated by the positioning system.

FIG. 1B illustrates a direct ultrasonic reflection 121 received by the positioning system 110. As illustrated, the direct ultrasonic reflection 121 may convey information in a relatively two-dimensional fashion in which the three persons 151, 152, and 153 are viewed as a single object 160, or as three distinct objects (161, 162, and 163) in substantially the same plane. FIG. 1B illustrates a visual representation of the received direct reflection of ultrasound 121. The actual positional data received may be at a higher or lower resolution depending on the sampling rates, accuracy, processing bit depth, frequency(ies) of ultrasound used, etc.

Figure 2A:
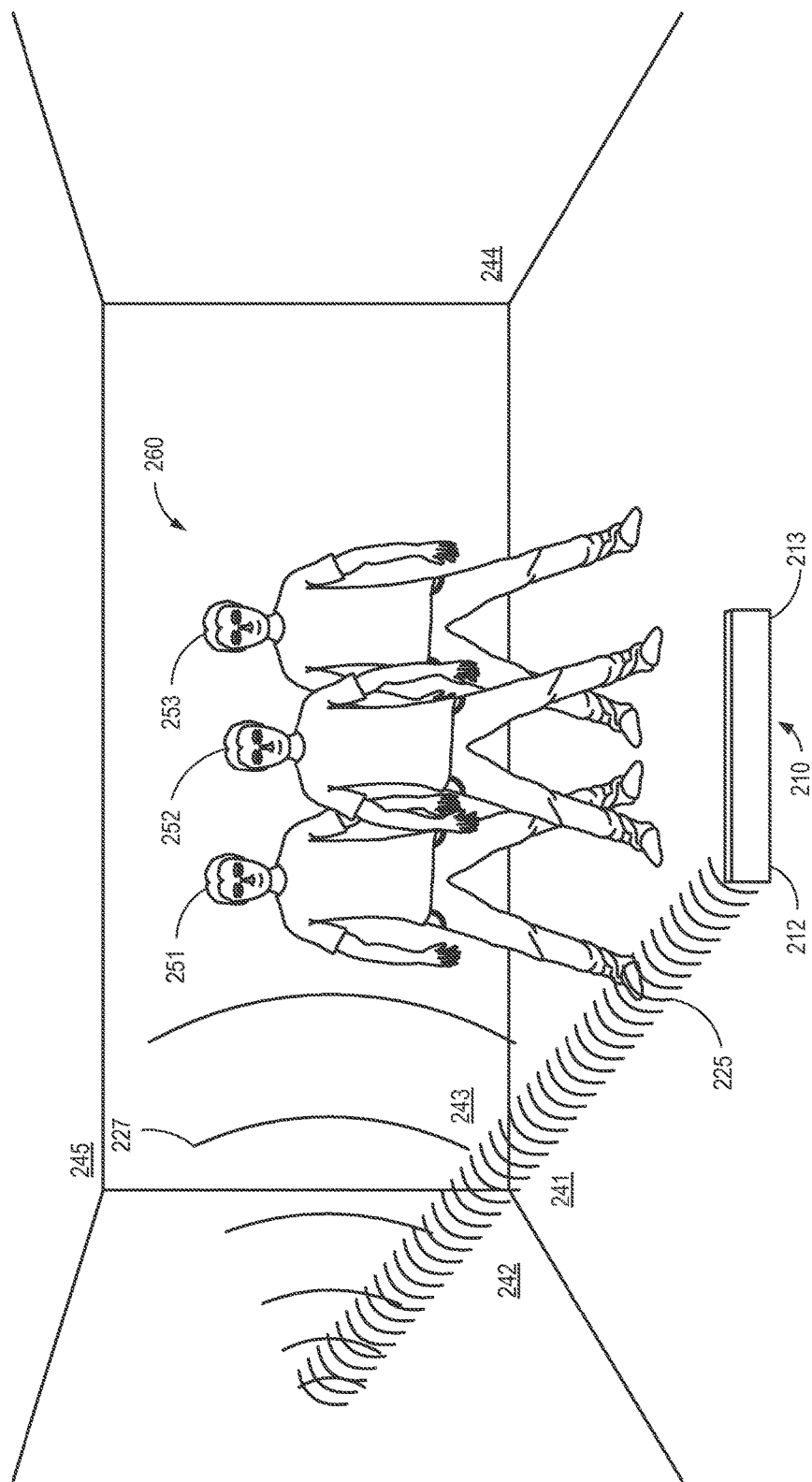
FIG. 2A illustrates a positioning system rebounding ultrasound off the wall and then toward the three persons.

FIG. 2A illustrates a positioning system 210, similar to that described in conjunction with FIGS. 1A and 1B, in which ultrasound 225 is transmitted toward a surface bounding the region 200. In the illustrated embodiment, the rebounding surface is left wall 242. It is appreciated that ultrasound may be rebounded off one or more of left wall 242, floor 241, back wall 243, right wall 244, and/or ceiling 245.

As used herein, the terms rebound and rebounding may include any type of reflection, refraction, and/or repeating that may or may not include a phase, frequency, modulation, and/or amplitude change. Rebounding may performed by the outer surface of the surface, an inner portion of the surface, or an object disposed on, in, or behind the surface (e.g., exterior paint, drywall, internal metal, studs, interior coatings, mounted panels, etc.).

The ultrasound may ultimately be rebounded 227 to reflect off persons 251, 252, and 253 at a different angle than that obtained in FIGS. 1A and 1B. The illustrated embodiment shows the rebounded ultrasound 227 reflecting off the left wall 242 prior to the persons 251-253. However, the ultrasound may reflect off persons 251-253 prior to the left wall 242 instead. Ultimately, ultrasound 225 may be rebounded and/or reflected by persons 251-253 and one or more of surfaces/walls 241-245 in any order and then be received by positioning system 210.

FIG. 2B illustrates a side view of the positioning system 210 described in conjunction with FIG. 2A with the rebounded ultrasound 226 being received after reflecting off persons 251-253, at 228, and rebounding off left wall 242. FIG. 2B also shows a front wall 246. In some embodiments, all of the ultrasound may be transmitted against a front wall 246 to more evenly distribute ultrasound throughout the region (i.e., a wider effective beam width).

As illustrated in FIG. 2B, the positional data obtained by the rebounded ultrasound 226 may provide information not available via the direct reflections shown in FIGS. 1A and 1B, e.g., due to one object preventing direct ultrasound from reaching a second object (or another portion of the first object). For instance, the visual representation of the positional data obtained illustrates three distinct objects 261, 262, and 263 that are clearly in distinct planes relative to the positioning system 210. For instance, the positional data generated based on the rebounded ultrasound in FIG. 2B shows a distance D between object 262 and object 241. Such a distance D may be difficult to determine or determined differently if only direct reflections were available (as in FIGS. 1A and 1B).

Figure 3A:
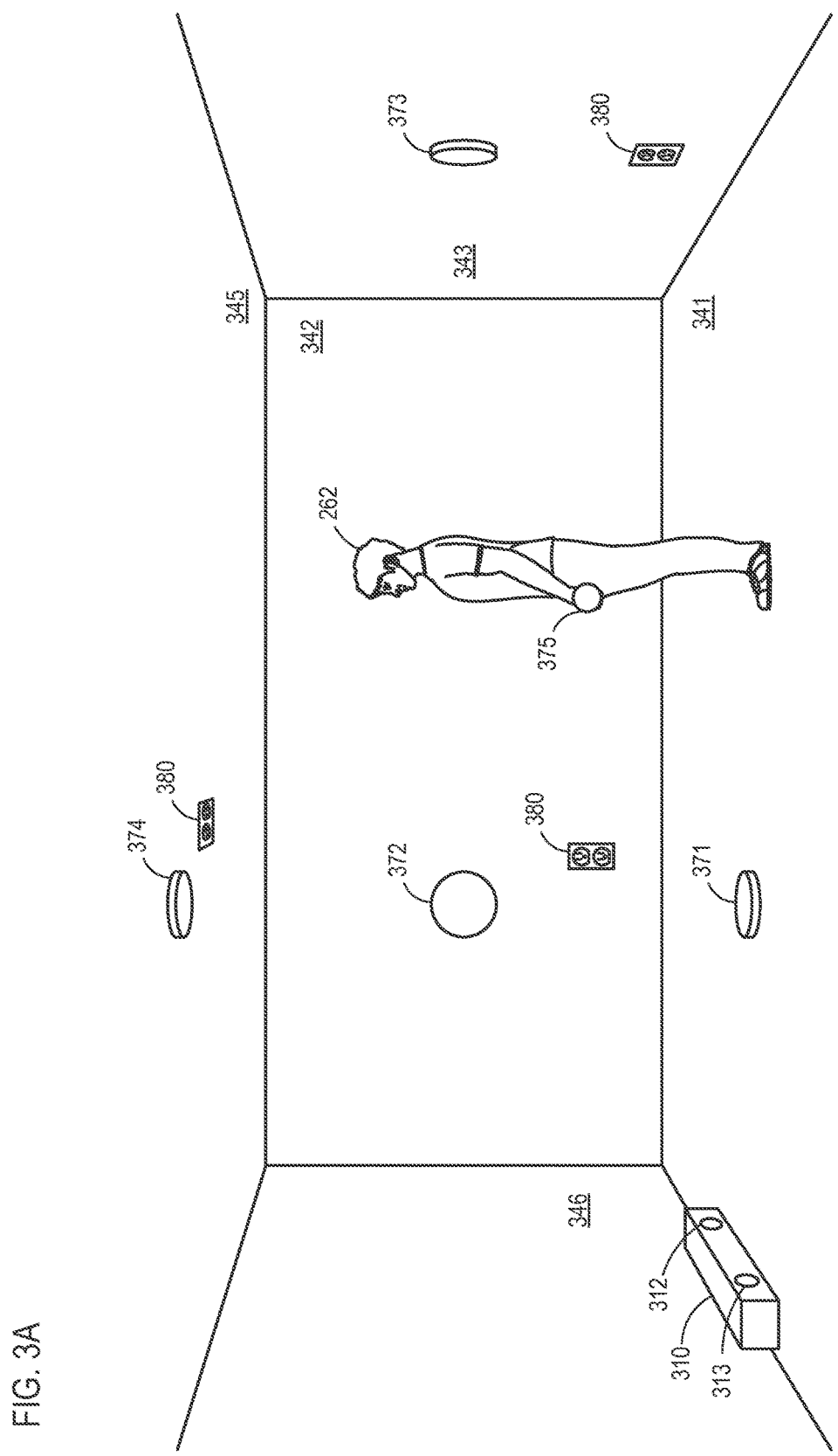
FIG. 3A illustrates a plurality of ultrasonic reflectors configured to facilitate the transmission, reflection, and/or reception of rebounded ultrasound by the positioning system.

FIG. 3A illustrates a plurality of ultrasonic reflectors 371, 372, 373, and 374 secured to, mounted to, positioned within, and/or integrally formed with one or more of the surfaces 341, 342, 343, 345, and 346. In some embodiments, a user/subject may hold or otherwise control a portable ultrasonic reflector 375. The ultrasonic reflectors 371-375 may facilitate the transmission, reflection, and/or reception of rebounded ultrasound by the positioning system 310.

The ultrasonic reflectors may comprise passive, active, and/or actively moved/pivoted ultrasonic reflectors for controlling the direction in which ultrasound rebounds and/or otherwise travels within the region. For example, the ultrasonic reflector may be configured to modify one or more of the frequency, phase, and/or amplitude of the rebounded ultrasound. The modified characteristic may facilitate the differentiation of the direct ultrasonic reflections and the rebounded ultrasonic reflections.

The mapping or positing system 310 may generate positional data associated with one or more of the object(s) based on the direct ultrasonic reflection(s) (e.g., FIGS. 1A and 1B) and/or the rebounded ultrasonic reflection(s) (e.g., FIGS. 2A and 2B). The positional data may comprise a centroid of the objects, a two-dimensional mapping of the object, an image of the object, a false-color representation of the object, an information representation (blocks, squares, shadows, etc.) of the object, a three-dimensional mapping of the object, one or more features of the object, and/or other information.

The positional data may be defined with respect to one or more surfaces of the region, the positioning system 310, a receiver of the positioning system 312, and/or a transmitter 313 of the positioning system. The one or more objects within the region may comprise machinery, robots, furniture, household property, people in general, garners, human controllers of electronic devices, electronic devices, fixtures, and/or other human or non-human objects.

The object may comprise a specific portion of a person, such as a hand, figurer, arm, leg, foot, toe, torso, neck, head, mouth, lip, and/or eye. As illustrated in FIGS. 3A and 3B, rebounded ultrasonic transmissions may be reflected off an ultrasonic reflector 371-375 disposed within the room. In some embodiments, the ultrasonic reflectors may modify a characteristic of the reflected ultrasound facilitating the identification of the received rounded ultrasonic reflections.

FIG. 3B illustrates a plurality of active ultrasonic reflectors 391-394 configured to facilitate the transmission, reflection, and/or reception of rebounded ultrasound by the positioning system. As illustrated, active ultrasonic reflectors 391-394 may be connected to a power source, such as batteries, solar cells, heat converts, outlets 380, and/or other suitable power source. In some embodiments, the ultrasound itself may provide the power source.

Figure 4A:
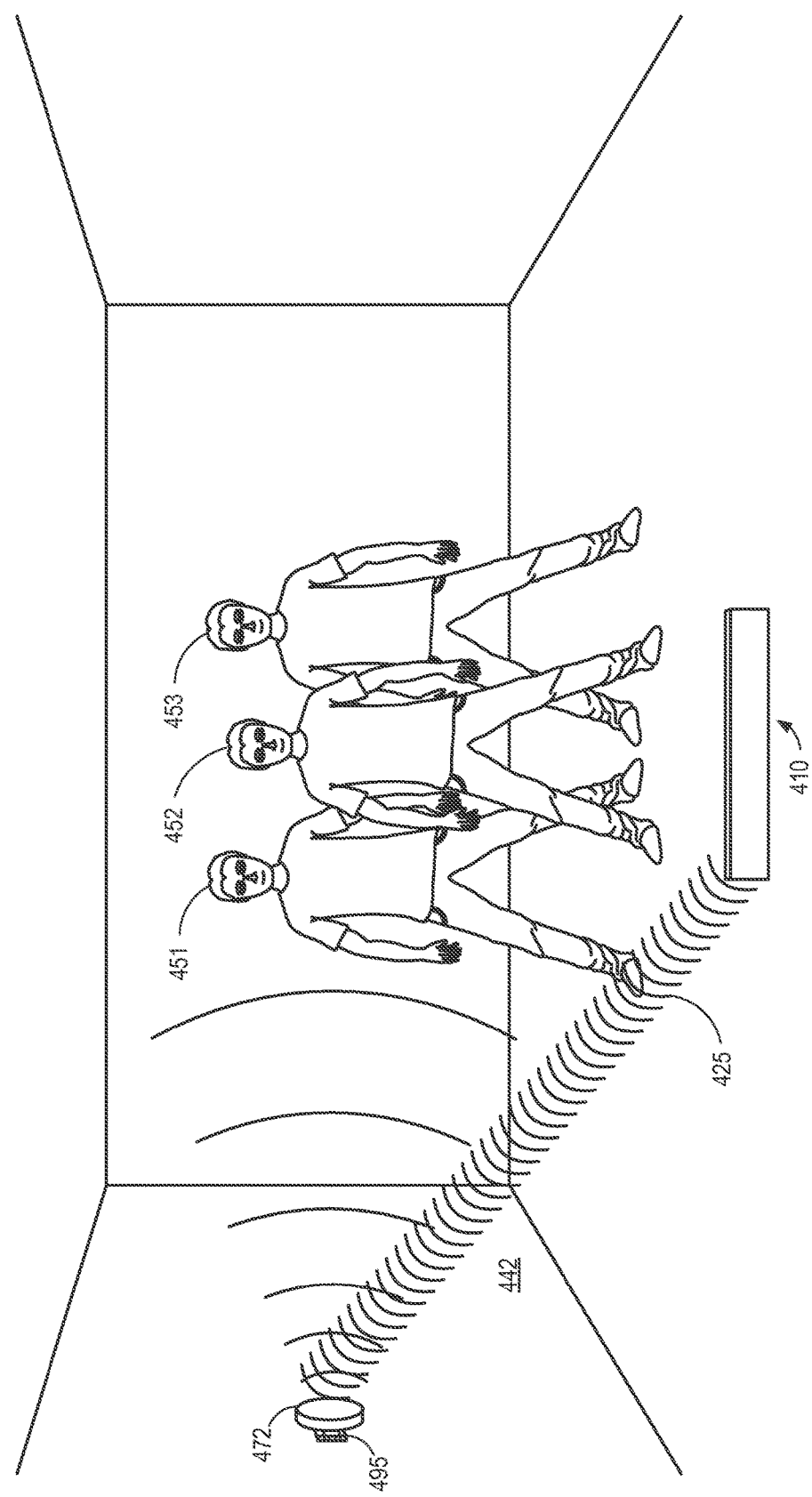
FIG. 4A illustrates an actively controlled ultrasonic reflector in a first position configured to pivot with respect to the wall on which it is mounted to facilitate the transmission, reflection, and/or reception of rebounded ultrasound by the positioning system.

FIG. 4A illustrates an actively controlled ultrasonic reflector 472 in a first position. A positioning system 410 may be in communication with the ultrasonic reflector 472, or the ultrasonic reflector 472 may be autonomous. In various embodiments, the positioning system 410 may transmit ultrasound 425 toward the persons 451, 452, and 453 or toward the wall 442, as illustrated. The ultrasound 425 may then be rebounded off the wall 442 or reflected by the persons 451-453, respectively.

Figure 4B:
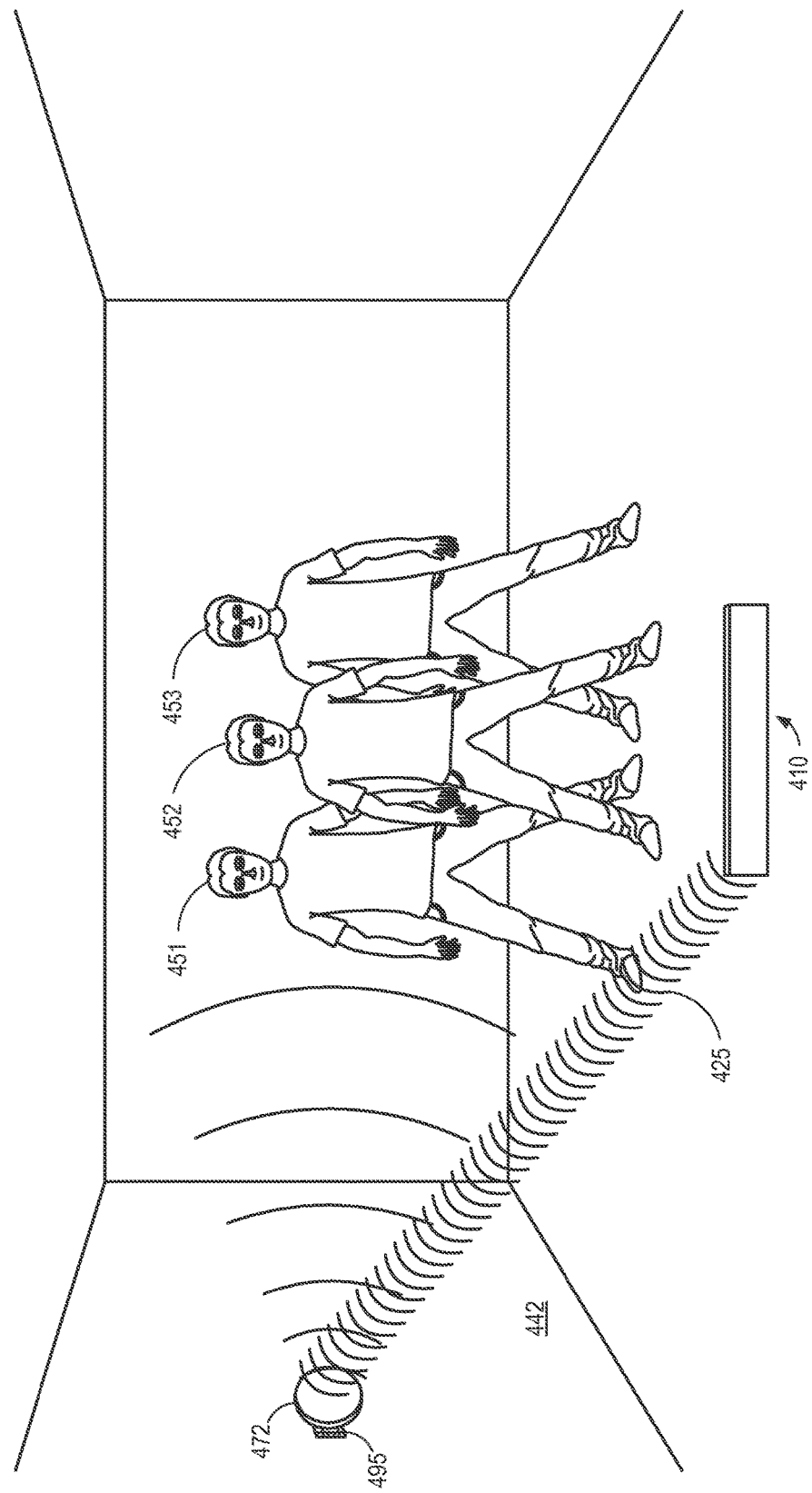
FIG. 4B illustrates the actively controlled ultrasonic reflector in a second position.

FIG. 4B illustrates the actively controlled ultrasonic reflector 472 in a second position. The ultrasonic reflector 472 may be pivoted and/or controlled by a pivot control 495.

In some embodiments, pivot control 495 may change other reflective, absorptive, and/or refractive properties of the ultrasonic reflector 472, in addition to its direction. For example, an ultrasonic reflector 472 may have specific ultrasonic or other acoustic absorptive properties. A pivot control 495 may adjust the pivoting and/or acoustic and/or electrical properties.

Figure 5:
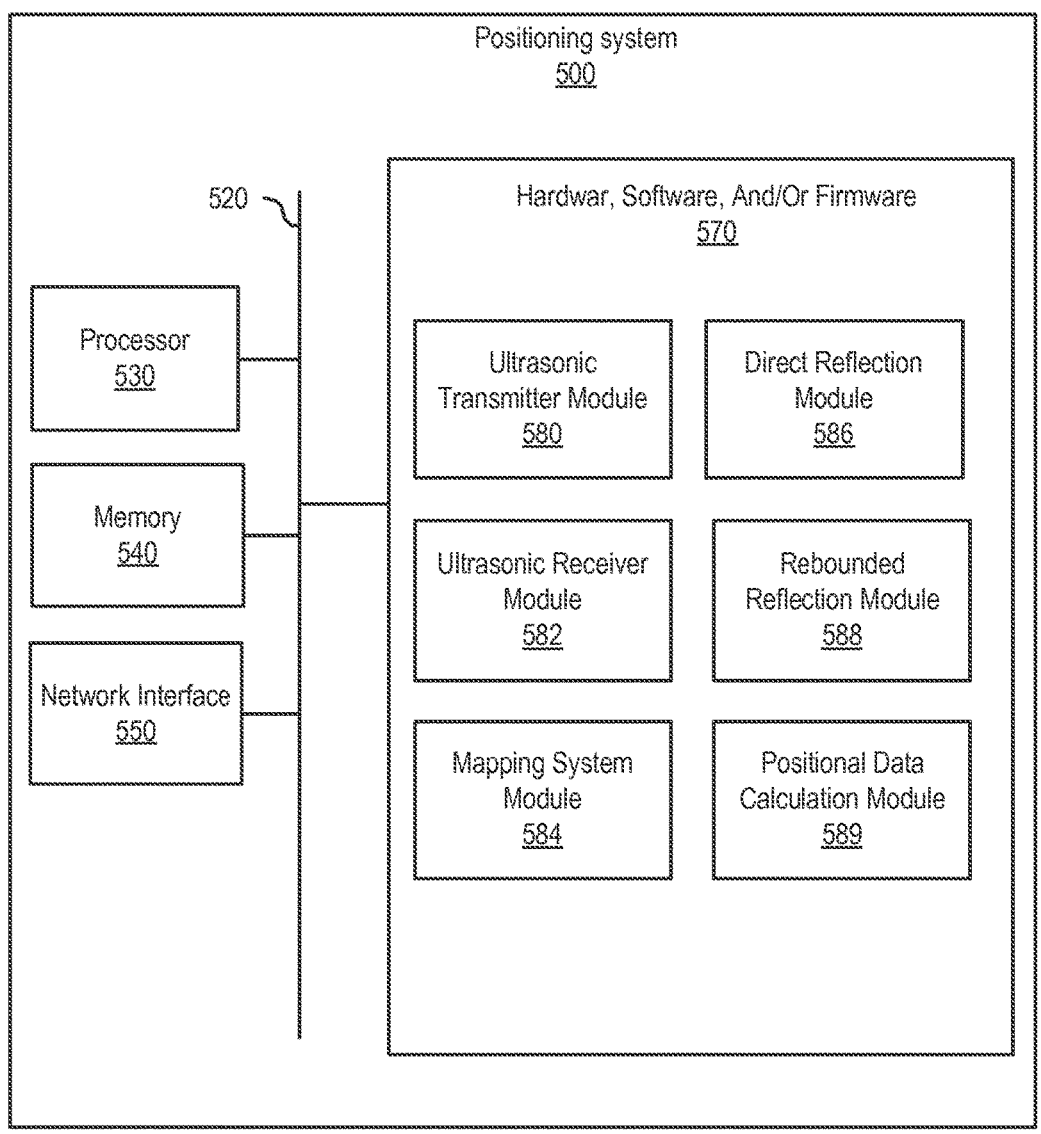
FIG. 5 illustrates a block diagram of a positioning system, according to one embodiment.

FIG. 5 illustrates a block diagram of a positioning system 500, according to one embodiment. As illustrated, a positioning system 500 may include a processor 530, a memory 540, and possibly a network 550 or other data transfer interface. A bus 520 may interconnect various integrated and/or discrete components. Various modules may be implemented in hardware, software, firmware, and/or a combination thereof.

An ultrasonic transmitter module 580 may be configured to transmit ultrasound in any of the various forms and/or methods described herein. An ultrasonic receiver module 582 may be configured to receive a direct ultrasonic reflection from an object within a region. Additionally, the ultrasonic receiver module 582 may be configured to receive rebounded ultrasonic reflection from the object. As used herein, direct reflections and rebounded reflections refer to the various descriptions provided herein as well as the generally understood and variations of these terms.

A mapping system module 584 generates direct positional data associated with the object based on one or more direct ultrasonic reflections. The mapping system module 584 may also generate direct positional data associated with the object based on one or more indirect ultrasonic reflections, as may be understood in the art. The mapping system module 584 may also generate rebounded positional data associated with the object based on one or more indirect ultrasonic reflections, as may be understood in the art.

A direct reflection module 586 may be configured to facilitate, manage, and/or monitor the transmission and/or reception of direct reflections. The rebounded reflection module 588 may be configured to facilitate, manage, and/or monitor the transmission and/or reception of rebounded reflections.

The positional data calculation module 589 may generate direct positional data associated with the object based on one or more direct ultrasonic reflections. The positional data calculation module 589 may also generate rebounded positional data associated with the object based on one or more rebounded ultrasonic reflections. The positional data calculation module 589 may also generate enhanced positional data by combining the direct positional data and the rebounded positional data.

Figure 6:
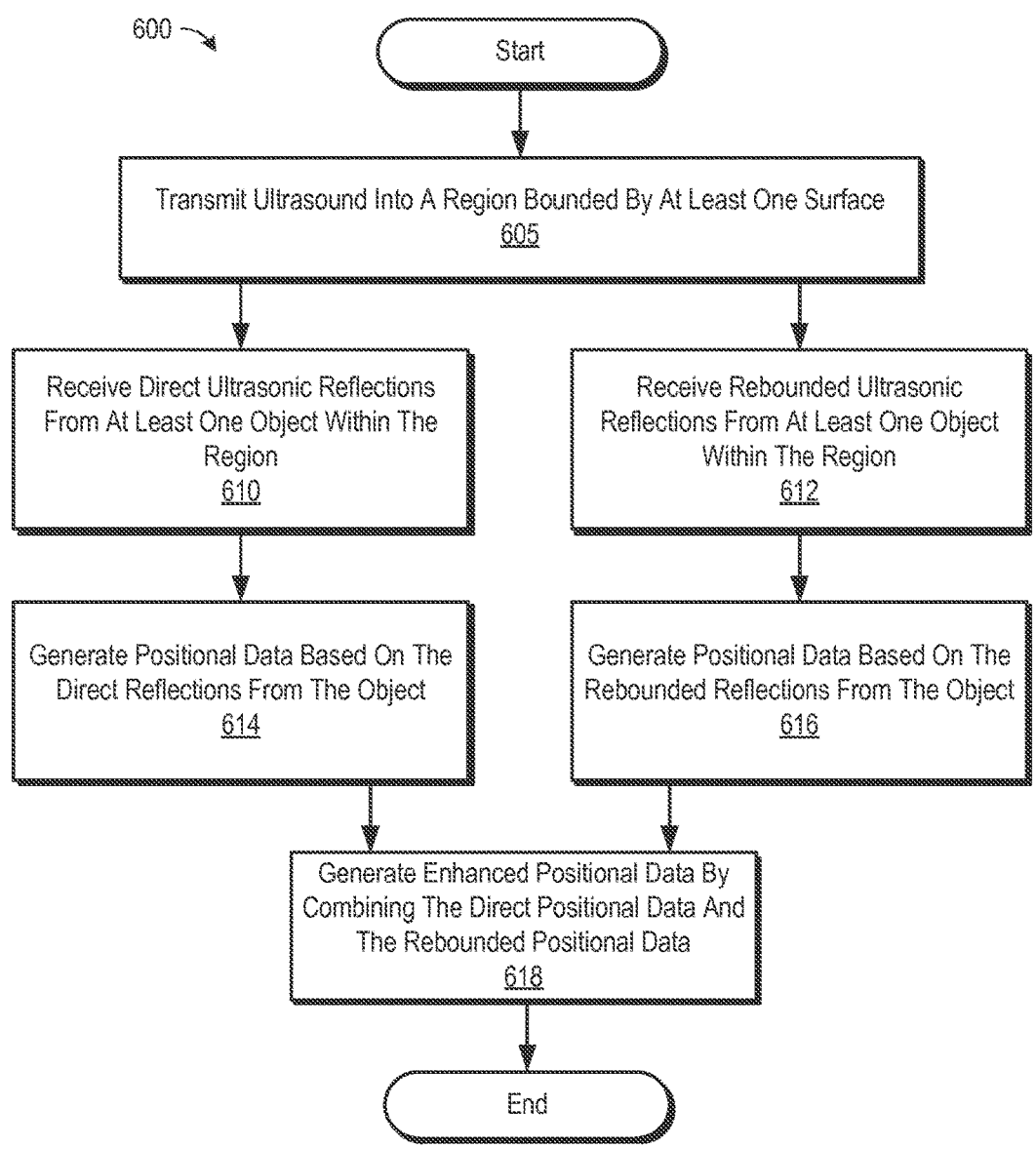
FIG. 6 illustrates a flow chart of a method for generating positional data describing a relative position of one or more objects within a region.

FIG. 6 illustrates a flow chart of method 600 for generating positional data describing a relative position and/or movement of one or more objects within a region. The method steps are provided in no particular order and may be rearranged as would be technically feasible. A positioning system may transmit 605 ultrasound into a region bounded by at least one surface. The positioning system may receive 610 direct ultrasonic reflections from at least one object within the region.

The positioning system may receive 612 rebounded ultrasonic reflections from at least one object within the region. The rebounded ultrasonic reflections may reflect off the wall(s) first and/or off the object(s) first. The positioning system may generate 614 positional data based on the direct reflections from the object. The positioning system may generate 616 positional data based on the rebounded reflections from the object.

The positioning system may generate 618 enhanced positional data by combining the direct positional data and the rebounded positional data. In other embodiments, the positioning system may transmit the direct positional data and the rebounded positional data to another electronic or other processing device for usage.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. The scope of the present invention should, therefore, be determined by the following claims:

The invention claimed is:

1. A method for determining positional data of a plurality of objects within a region, comprising:
   transmitting ultrasound, via an ultrasonic transmitter, into a region bounded by a first surface;
   receiving, via an ultrasonic receiver, a direct ultrasonic reflection from the plurality of objects within the region;
   generating direct, two-dimensional positional data associated with the plurality of objects based on the direct ultrasonic reflection, wherein the direct, two-dimensional positional data of the plurality of objects includes at least a first object and a second object that appear to be overlapping in a first plane such that the first object is at least partially indistinguishable from the second object;
   receiving, via the ultrasonic receiver, a rebounded ultrasonic reflection from the plurality of objects, wherein the rebounded ultrasonic reflection comprises ultrasound reflected by the plurality of objects and the first surface, and then received by the ultrasonic receiver, such that the rebounded ultrasonic reflection is reflected by the plurality of objects at an angle relative to the direct ultrasonic reflection;
   generating rebounded, two-dimensional positional data using the rebounded ultrasonic reflection of the plurality of objects from the first surface, wherein the rebounded, two-dimensional positional data of the plurality of objects includes the first object and the second objects in a second plane that is at an angle relative to the first plane; and
   generating enhanced positional data by combining the two-dimensional positional data in the first plane from the direct ultrasonic reflection and the two-dimensional data in the second plane from the rebounded ultrasonic reflection to distinguish the first object from the second object.

2. The method of claim 1, wherein transmitting ultrasound comprises transmitting ultrasound between 20 kHz and 250 kHz.

3. The method of claim 1, wherein the positional data comprises a two-dimensional mapping of the object.

4. The method of claim 1, wherein the positional data is configured to be used to generate a visual representation (an image) of the object.

5. The method of claim 1, wherein the positional data comprises a three-dimensional mapping of the object.

6. The method of claim 1, wherein generating enhanced positional data by combining the direct positional data and the rebounded positional data comprises: using the direct positional data and the rebounded positional data to generate at least one of a three-dimensional image of the object, a three-dimensional representation of the object, and a three-dimensional mapping of the object.

7. A method for determining positional data of an object, comprising:
   transmitting ultrasound, via an ultrasonic transmitter, into a region bounded by a first surface;
   receiving, via an ultrasonic receiver, a direct ultrasonic reflection from an object within the region;
   generating direct positional data associated with the object based on the direct ultrasonic reflection;
   receiving, via the ultrasonic receiver, a rebounded ultrasonic reflection from the object, wherein the rebounded ultrasonic reflection comprises ultrasound reflected by the object and the first surface, and then received by the ultrasonic receiver;
   generating rebounded positional data using the rebounded ultrasonic reflection of the object from the first surface; and
   generating enhanced positional data by combining the direct positional data and the rebounded positional data transmitting a first ultrasonic pulse that is received as the direct ultrasonic reflection; and transmitting a second ultrasonic pulse that is received as the rebounded ultrasonic reflection.

8. The method of claim 7, wherein the ultrasonic receiver is configured to differentiate between the direct ultrasonic reflection and the rebounded ultrasonic reflection based on a time-of-flight difference between the first ultrasonic pulse and the second ultrasonic pulse.

9. The method of claim 7, wherein the second ultrasonic pulse is directed to an ultrasonic reflector disposed on the first surface, and wherein the ultrasonic reflector is configured to reflect the second ultrasonic pulse with a modified ultrasonic characteristic.

10. The method of claim 7, wherein the second ultrasonic pulse has a different ultrasonic characteristic than the first ultrasonic pulse.

11. The method of claim 10, wherein the ultrasonic characteristic comprises a phase.

12. The method of claim 10, wherein the ultrasonic characteristic comprises a modulation.

13. The method of claim 10, wherein the ultrasonic characteristic comprises an amplitude.

14. The method of claim 10, wherein the ultrasonic characteristic comprises a frequency.

15. The method of claim 7, further comprising:
transmitting one or more initial ultrasonic pulses prior to the first ultrasonic pulse; and
determining general positional data of at least one of the object and the first surface.

16. A system for determining positional data of a plurality of objects within a region, comprising:
an ultrasonic transmitter configured to transmit ultrasound into a region bounded by a first surface;
an ultrasonic receiver configured to:
receive a direct ultrasonic reflection from the plurality of objects within the region, and
receive a rebounded ultrasonic reflection from the plurality of objects, wherein the rebounded ultrasonic reflection comprises ultrasound reflected by the plurality of objects and the first surface, and then received by the ultrasonic receiver, such that the rebounded ultrasonic reflection is reflected by the plurality of objects at an angle relative to the direct ultrasonic reflection; and
a mapping system configured to:
generate direct, two-dimensional positional data associated with the plurality of objects based on the direct ultrasonic reflection, wherein the direct, two-dimensional positional data of the plurality of objects includes at least a first object and a second object that appear to be overlapping in a first plane such that the first object is at least partially indistinguishable from the second object;
generate rebounded, two-dimensional positional data using the rebounded ultrasonic reflection of the plurality of objects from the first surface, wherein the rebounded, two-dimensional positional data of the plurality of objects includes the first object and the second objects in a second plane that is at an angle relative to the first plane, and
generate enhanced positional data by combining the two-dimensional positional data in the first plane from the direct ultrasonic reflection and the two-dimensional data in the second plane from the rebounded ultrasonic reflection to distinguish the first object from the second object.

17. The system of claim 16, wherein the ultrasonic receiver comprises a first ultrasonic transducer configured to receive the direct ultrasonic reflection and a second ultrasonic transducer configured to receive the rebounded ultrasonic reflection.

18. The system of claim 17, wherein at least one of the first ultrasonic transducer and the second ultrasonic transducer is configured to determine a direction of the received ultrasound.

19. The system of claim 16, wherein the direct ultrasonic reflection from the object is reflected from a first portion of the object, and wherein the rebounded ultrasonic reflection from the object is reflected from a second portion of the object, where the first portion and the second portion are at least partially different portions of the object.

20. The system of claim 16, wherein the direct positional data corresponds to a first directional component of the position of the object and the rebounded positional data corresponds to a second directional component of the position of the object.

21. The system of claim 16, further comprising:
receiving, via the ultrasonic receiver, an additional rebounded ultrasonic reflection from the object,
wherein the additional rebounded ultrasonic reflection comprises ultrasound reflected by the object and a second surface bounding the region, and then received by the ultrasonic receiver;
generating additional rebounded positional data using the additional rebounded ultrasonic reflection of the object from the second surface; and
supplementing the enhanced positional data with the additional rebounded positional data.

22. The system of claim 21, wherein the ultrasonic receiver comprises a third ultrasonic transducer configured to receive the additional rebounded ultrasonic reflection.

23. The system of claim 16, wherein the ultrasonic transmitter is configured to:
transmit a first ultrasonic pulse that is received as the direct ultrasonic reflection; and
transmit a second ultrasonic pulse that is received as the rebounded ultrasonic reflection.

24. The system of claim 23, wherein the ultrasonic receiver is configured to differentiate between the direct ultrasonic reflection and the rebounded ultrasonic reflection based on a time-of-flight difference between the first ultrasonic pulse and the second ultrasonic pulse.

25. The system of claim 23, wherein the ultrasonic transmitter is configured to transmit one or more intermediary ultrasonic pulses between the time the first ultrasonic pulse is transmitted and the second ultrasonic pulse is transmitted.

26. The system of claim 23, wherein the ultrasonic transmitter is configured to transmit one or more initial ultrasonic pulses prior to the first ultrasonic pulse to aid in determining general positional data of at least one of the object and the first surface.

27. A system for determining positional data of an object within a region, comprising:
an ultrasonic transmitter configured to transmit ultrasound into a region bounded by a first surface;
an ultrasonic receiver configured to:
receive a direct ultrasonic reflection from an object within the region, and
receive a rebounded ultrasonic reflection from the object, wherein the rebounded ultrasonic reflection comprises ultrasound reflected by the object and the first surface, and then received by the ultrasonic receiver; and a mapping system configured to:
generate direct positional data associated with the object based on the direct ultrasonic reflection,
generate rebounded positional data using the rebounded ultrasonic reflection of the object from the first surface, and
generate enhanced positional data by combining the direct positional data and the rebounded positional data;
wherein the ultrasonic transmitter comprises a first ultrasonic transmitter configured to transmit the ultrasound directly at the object and a second ultrasonic transmitter configured to transmit the ultrasound to be rebounded off the first surface.

28. A computer-readable medium having instructions that, when executed by a processor, cause the processor to perform operations for determining positional data of a plurality of objects within a region, the operations comprising:

transmitting ultrasound, via an ultrasonic transmitter, into a region bounded by a first surface;
receiving, via an ultrasonic receiver, a direct ultrasonic reflection from the plurality of objects within the region;
generating direct, two-dimensional positional data associated with the plurality of objects based on the direct ultrasonic reflection, wherein the direct, two-dimensional positional data of the plurality of objects includes at least a first object and a second object that appear to be overlapping in a first plane such that the first object is at least partially indistinguishable from the second object;
receiving, via the ultrasonic receiver, a rebounded ultrasonic reflection from the plurality of objects, wherein the rebounded ultrasonic reflection comprises ultrasound reflected by the plurality of objects and the first surface, and then received by the ultrasonic receiver, such that the rebounded ultrasonic reflection is reflected by the plurality of objects at an angle relative to the direct ultrasonic reflection;
generating rebounded, two-dimensional positional data using the rebounded ultrasonic reflection of the plurality of objects from the first surface, wherein the rebounded, two-dimensional positional data of the plurality of objects includes the first object and the second objects in a second plane that is at an angle relative to the first plane; and
generating enhanced positional data by combining the two-dimensional positional data in the first plane from the direct ultrasonic reflection and the two-dimensional data in the second plane from the rebounded ultrasonic reflection to distinguish the first object from the second object.

* * * * *

UNITED STATES PATENT AND TRADEMARK OFFICE
CERTIFICATE OF CORRECTION

PATENT NO. : 9,618,618 B2  
APPLICATION NO. : 14/203401  
DATED : April 11, 2017  
INVENTOR(S) : Jesse R. Cheatham, III et al.

It is certified that error appears in the above-identified patent and that said Letters Patent is hereby corrected as shown below:

In the Claims

Column 12, Lines 24-25, Claim 1: "and the second objects in a second plane" should read --and the second object in a second plane--

Column 13, Lines 59-60, Claim 16: "and the second objects in a second plane" should read --and the second object in a second plane--

Column 16, Lines 18-19, Claim 28: "and the second objects in a second plane" should read --and the second object in a second plane--

Signed and Sealed this  
Sixth Day of June, 2017

Michelle K. Lee  
*Director of the United States Patent and Trademark Office*